United States Patent [19]

Ogawa

[11] Patent Number: 5,452,275
[45] Date of Patent: Sep. 19, 1995

[54] TWO-STAGE ACTUATOR CONTROL DEVICE

[75] Inventor: Masaharu Ogawa, Hyogo, Japan

[73] Assignee: Mitsubishi Denki Kabushiki Kaisha, Tokyo, Japan

[21] Appl. No.: 254,679

[22] Filed: Jun. 6, 1994

Related U.S. Application Data

[63] Continuation of Ser. No. 907,552, Jul. 2, 1992, abandoned.

[30] Foreign Application Priority Data

Jul. 4, 1991 [JP] Japan .................. 3-164402

[51] Int. Cl.⁶ .............................................. G11B 5/596
[52] U.S. Cl. .................. 369/44.11; 369/44.28; 369/44.35; 360/78.05; 318/568.17; 318/568.18
[58] Field of Search ............... 369/44.11, 44.28, 44.27, 369/44.29, 44.25, 44.35, 44.32; 360/78.04, 78.05, 78.06, 78.12; 318/568.1, 568.17, 568.18, 592, 593

[56] References Cited

U.S. PATENT DOCUMENTS

| | | | |
|---|---|---|---|
| 4,748,392 | 5/1988 | Fincher et al. | 360/78.04 |
| 4,755,977 | 7/1988 | Abed | 369/44.29 |
| 5,090,001 | 2/1992 | Ito et al. | 369/44.28 |

OTHER PUBLICATIONS

"A Two–Stage Coupling Servo System for an Optical Disc Memory" Theses of the Optical Memory Symposium, 1985. pp. 203–208.
"Tracking Servo for Small Size Optical Disk System"; Nomura et al.; C&C Systems Research Laboratories, NEC Corp.

Primary Examiner—Scott J. Sugarman
Assistant Examiner—Muhammad N. Edun
Attorney, Agent, or Firm—Leydig, Voit & Mayer

[57] ABSTRACT

The two-stage actuator control device comprises a first actuator which can be driven in a small operating range and at high frequencies, a drive circuit for driving the first actuator, a second actuator which can be driven in a large operating range and at low frequencies, a drive circuit for driving the second actuator, a low pass filter for separating the operating regions of the two actuators, a position detector for detecting the relative position of the first actuator with respect to the second actuator, and a differentiator for differentiating the position signal of the position detector, in which the output of the differentiator is fed back to the input of the first actuator drive circuit 2. Thereby, the stability of the two-stage actuator control device is improved.

8 Claims, 4 Drawing Sheets

TWO-STAGE ACTUATOR CONTROL DEVICE

This application is a continuation of application Ser. No. 07/907,552, filed Jul. 2, 1992, now abandoned.

BACKGROUND OF THE INVENTION

The present invention relates to a control device which is used to control the position of the leading end of an actuator.

Referring to FIG. 4, there is shown a block diagram of a two-stage actuator tracking control system of an optical disc device which is published under the title of "A TWO-STAGE COUPLING SERVO SYSTEM FOR AN OPTICAL DISC MEMORY" in the theses of the optical memory symposium '85, pp. 203 to 208. In FIG. 4, the sum of a positioning signal 13 of a tracking actuator 3 operable at high frequencies in a small range, and a positioning signal 16 of a linear motor 8 operable at low frequencies in a large range provides a positioning signal 10 of an optical spot. A difference between a target positioning signal 9 and the optical spot positioning signal 10 provides a track shift quantity (control deviation) 11 and is then input to a stabilizing compensator 1 included in a two-stage coupling servo system. An output signal 12 of the stabilizing compensator 1 is input through a tracking actuator drive circuit 2 to the tracking actuator 3. Also, the output signal 12 of the stabilizing compensator 1 is input to a coupling compensator 41, which is adapted to allow mainly low frequencies to pass therethrough, through a linear motor drive circuit 7 to the linear motor 8. That is, a low frequency component of a control deviation 11 is transmitted to the linear motor 8, while a high frequency component of the control deviation 11 is transmitted to the tracking actuator 3.

In FIG. 5, there are shown a transfer characteristic 51 which is obtained by a combination of the tracking actuator drive circuit 2 and tracking actuator 3 and a transfer characteristic 52 which is obtained by a combination of the coupling compensator 41, linear motor drive circuit 7 and linear motor 8. As can be understood from FIG. 5, with $\omega_c$ as the boundary, the operating region of the tracking actuator 3 is separated from the operating region of the linear motor 8. However, at $\omega_1$ as well, the gain of the transfer characteristic 51 is equal to that of 52 and a phase difference between the two transfer characteristics 51 and 52 is near to 180°.

For this reason, in the above-mentioned conventional two-stage actuator control device, if the device is vibrated at about frequencies of $\omega_1$, then the tracking actuator 3 and linear motor 8 are vibrated at a mutually equal amplitude and in substantially opposite directions to thereby increase the amplitude of the device too greatly, so that the two-stage coupling servo system becomes destabilized.

SUMMARY OF THE INVENTION

The present invention aims at eliminating the drawbacks found in the above-mentioned conventional two-stage actuator control device. Accordingly, it is an object of the invention to provide a two-stage actuator control device which can reduce frequencies having an ill effect thereon to thereby improve the vibration resistance of the device as well as to further stabilize a two-stage actuator control system of the device.

In order to achieve the above object, according to the invention, there is provided a two-stage actuator control device which includes a first actuator operable at high frequencies in a small operating range and a second actuator operable at low frequencies in a large operating range and adapted to operate the first and second actuators cooperatively, with the operating regions thereof being separated such that the first actuator is mainly operable at high frequencies and the second actuator is mainly operable at low frequencies, to thereby control the position of the leading end of the first actuator, the two-stage actuator control device including a sensor for detecting the relative position or speed of the first actuator in the driving direction thereof with respect to the second actuator, whereby the speed of the first actuator is fed back electrically to thereby reduce a peak gain at the primary resonance frequency of the first actuator, so that a frequency at which the gains of the first and second actuators are equal to each other can be set higher than the primary resonance frequency of the first actuator.

According to the invention, a damping effect is enhanced at the primary resonance frequency of a first actuator subject to vibration to thereby prevent the respective actuators of the two-stage actuator system from being equal in gain at the primary resonance frequency and in the neighborhood thereof, so that destabilization of the two-stage actuator control system can be avoided.

DESCRIPTION OF PREFERRED EMBODIMENTS

Figure 1:
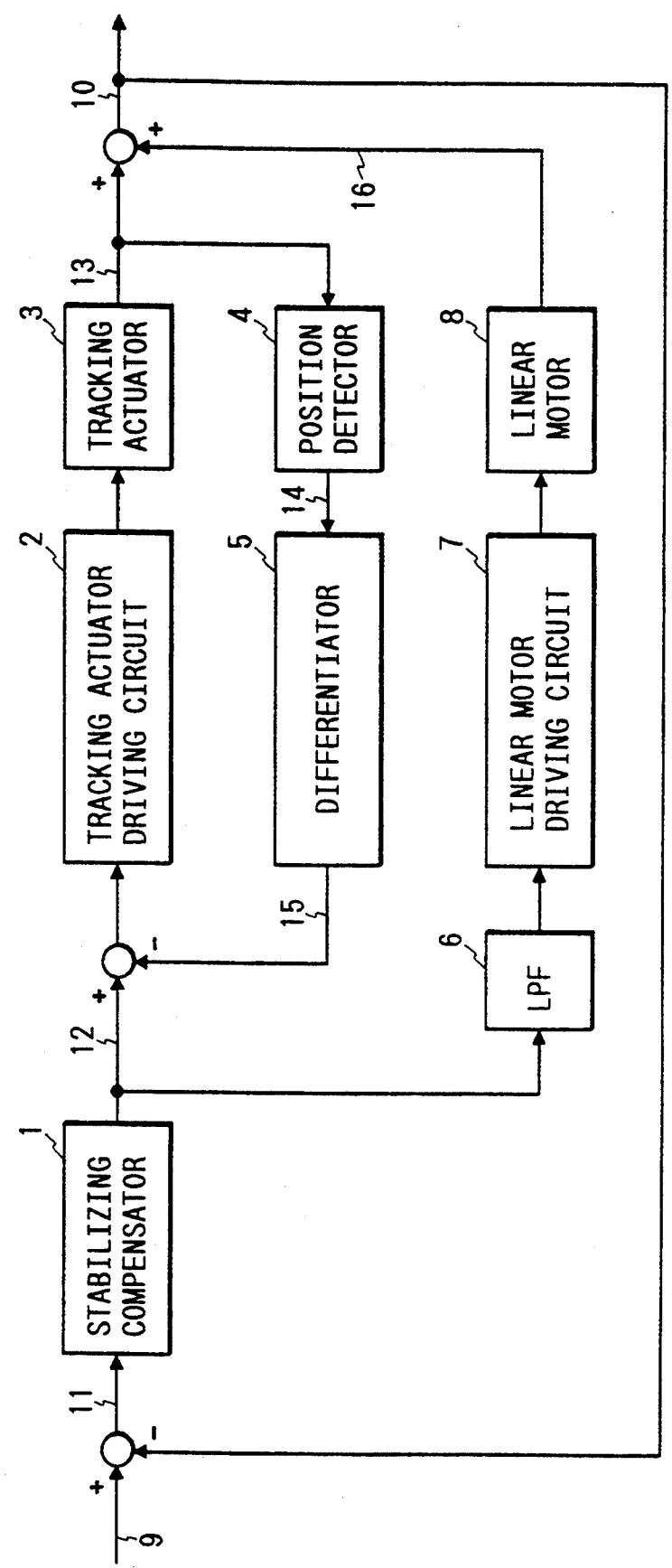
FIG. 1 is a block diagram of an embodiment of a two-stage actuator control device according to the invention.
Figure 4:
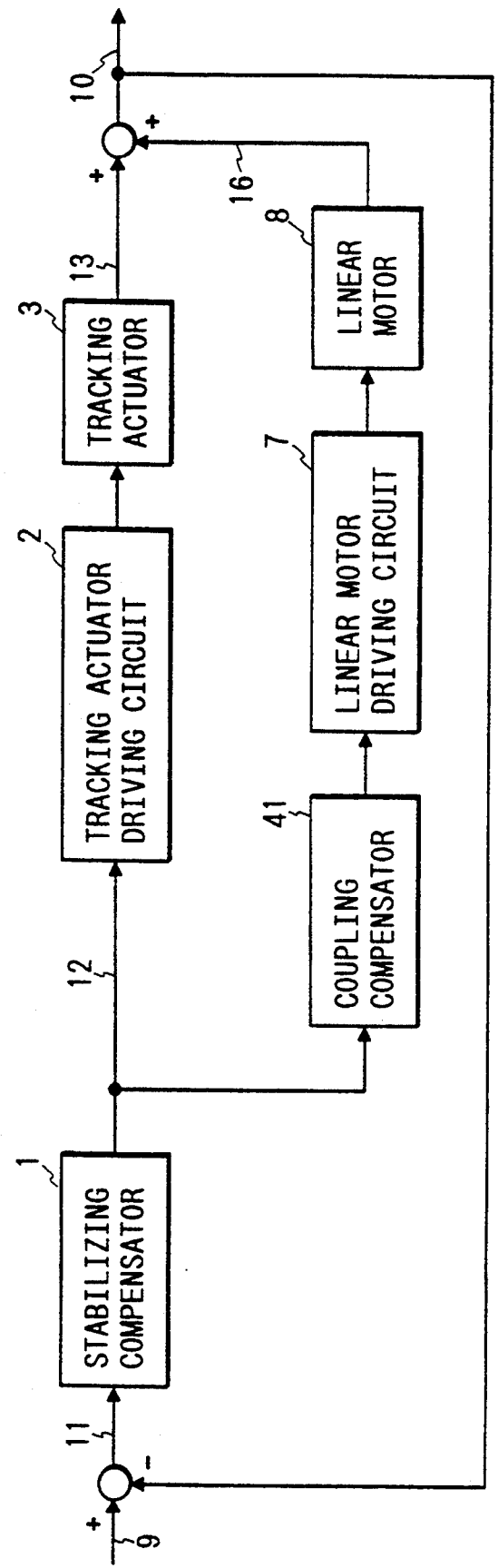
FIG. 4 is a block diagram of a conventional two-stage actuator control device; and, FIG. 5 is a graphical representation to explain the characteristic of the conventional two-stage actuator control device shown in FIG. 4.

Referring now to FIG. 1, there is shown a block diagram of a first embodiment of a two-stage actuator control device according to the invention. In FIG. 1, the parts that are given the same designations as those in FIG. 4 refer to the same blocks and signals as those in FIG. 4. Reference numeral 4 designates a detector which is used to detect the position of the first actuator 3. Reference numeral 5 designates a differentiator used to differentiate a positioning signal 14 detected by the detector 4. Reference numeral 15 represents a speed signal of the first actuator 3. And, reference numeral 6 designates a low pass filter for separating the operating regions of the two actuators. In this figure, the sum of a relative positioning signal 13 of the first actuator 3, which can be operated at high frequencies in a small operating range, with respect to a second actuator 8 which can be operated at low frequencies in a large operating range, and a positioning signal 16 of the second actuator 8 provides the leading end positioning signal 10 of the first actuator to be controlled. The two-stage actuator control system is operated in such a manner that a difference between a target positioning signal 9 and the leading end positioning signal 10 of the first actuator 3 can be minimized. In this operation, the speed signal 15 of the first actuator 3 is fed back with a reversed polarity to the input of a first actuator drive circuit 2. On the other hand, a low frequency component of the signal 12 that has passed through a stabilizing compensator 1 of a position deviation 11 is input through a drive circuit 7 to the second actuator 8 which is operable at low frequencies in a large operating range. In an optical disc device, for example, the first actuator 3 corresponds to a tracking actuator for driving an object lens, and the second actuator 8 corresponds to a linear motor for driving an optical head.

Figure 3:
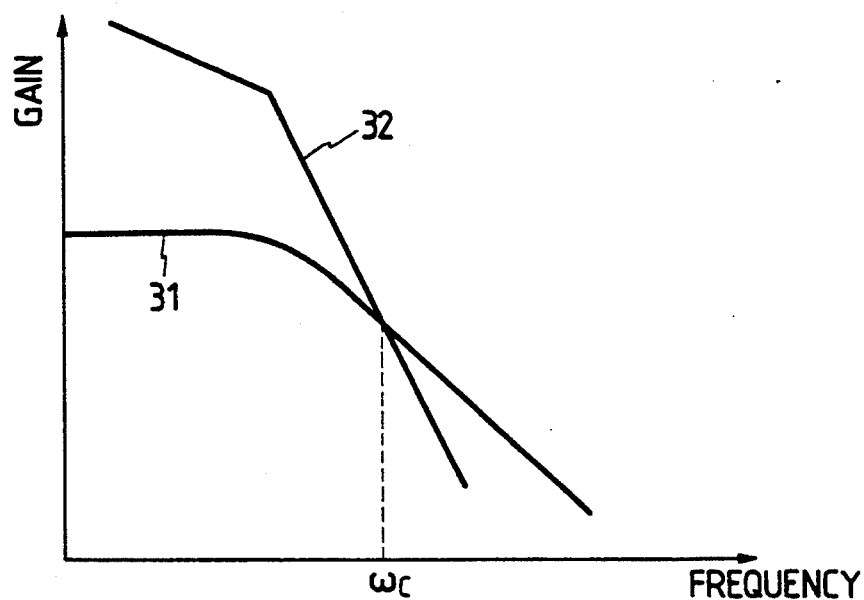
FIG. 3 is a graphical representation to explain the characteristic of the two-stage actuator control device shown in FIG. 1.
Figure 5:
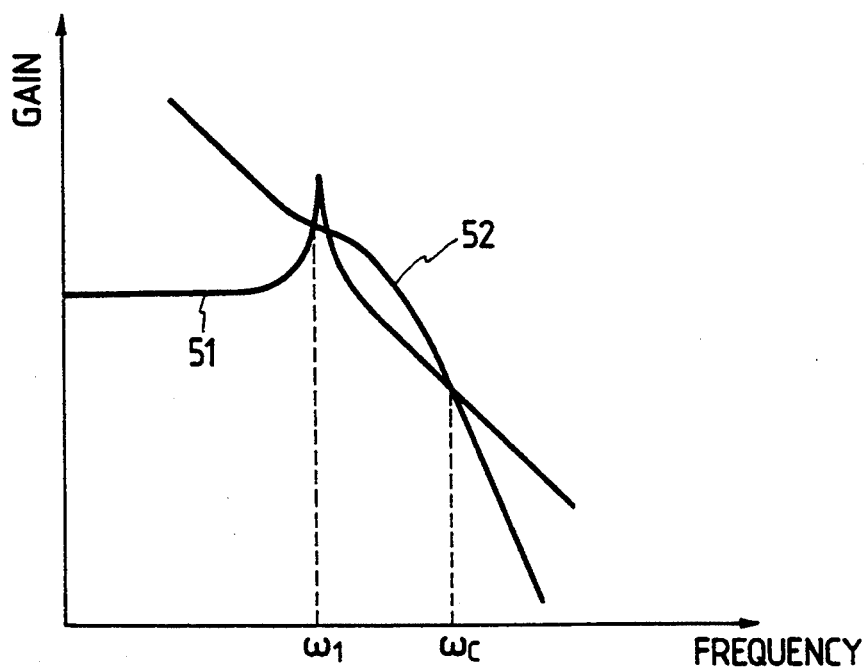

Referring now to FIG. 3, there is shown a graphical representation of a transfer characteristic of a two-stage actuator control device shown in FIG. 1. Since the speed feedback is electrically directed to the first actuator 3, the vibratory movements of the first actuator 3 are damped, with the result that a transfer characteristic 31 from the output signal 12 to the positioning signal 13, as shown in FIG. 3, does not have such a gain peak at the frequency $\omega_1$ approximately as shown in FIG. 5. Also, the transfer characteristic 32 of the low pass filter 6, second actuator drive circuit 7 and second actuator 8 respectively shown in FIG. 1 provides one as shown in FIG. 3. And thus the structure of the low pass filter 6 can be simplified. As shown in FIG. 3, if $\omega_c$ is determined such that $\omega_c > \omega_1$, then there are not present any frequencies at which the gains of the two actuator systems are equal to each other except for the frequency of $\omega_c$, so that the destabilized condition of the two-stage actuator control device can be eliminated at the frequency that corresponds to $\omega_1$ in FIG. 5.

Figure 2:
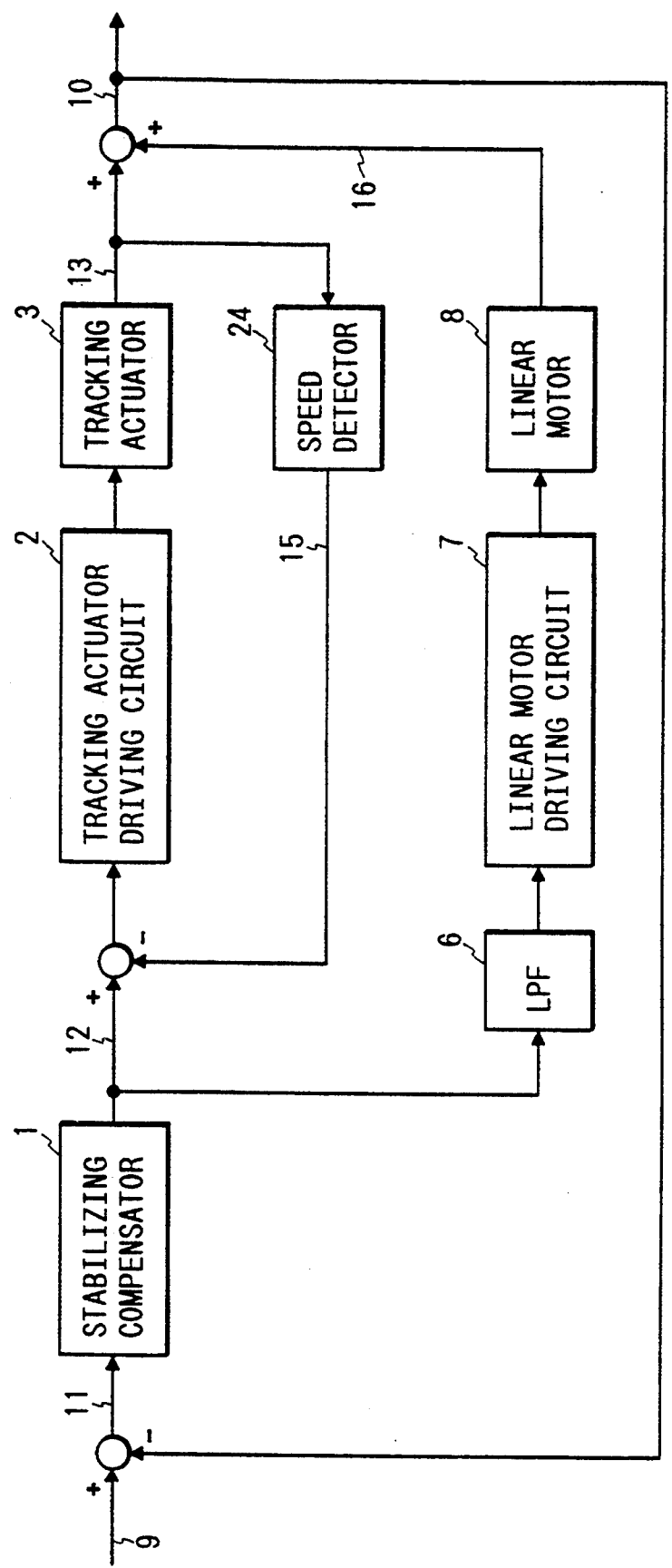
FIG. 2 is a block diagram of another embodiment of a two-stage actuator control device according to the invention.

Next, with referring to FIG. 2, there is shown a block diagram of another embodiment of a two-stage actuator control device according to the invention. In FIG. 2, the parts that are given the same designations as those in FIG. 1 are the same parts as those shown in FIG. 1. Reference numeral 24 designates a speed detector which is used to detect the speed 15 of the first actuator operable in a small operating range and at high frequencies. In other words, according to the invention, as in the present embodiment, there may be eliminated such need to detect and differentiate the position of the first actuator and thus feed back the speed of the first actuator as in the embodiment shown in FIG. 1, but the speed of the first actuator may be detected directly and may be fed back.

The present invention can be applied not only to an optical disc device but also to, for example, a positioning device for positioning the leading end of a robot having a two-stage actuator.

As has been described heretofore, according to the invention, due to the fact that the speed of the first actuator operable in a small operating range and at high frequencies is fed back, it is possible to improve the stability of the two-stage actuator control device, stabilize the device against external disturbances such as external vibrations and the like, and enhance the performance of the device.

What is claimed is:

1. A two-stage actuator control device comprising:
    a stabilizing compensator which generates an output signal;
    first actuator means for generating a first positioning signal, said first actuator means having an input and an output;
    means for generating a speed signal for said first actuator, said means for generating a speed signal having an input and an output, the input of said means for generating a speed signal being connected to the output of said first actuator means;
    second actuator means for generating a second positioning signal, said second actuator means having an input and an output, the output of said stabilizing compensator being connected to the input of said second actuator means said first actuator means being mounted on said second actuator means;
    logic means for subtracting the speed signal from the output signal from said stabilizing compensator, said logic means having an output connected to the input of said first actuator means.

2. A two-stage actuator control device as claimed in claim 1 wherein said means for generating a speed signal comprises a position detector for detecting a position of said first actuator means and a differentiator for differentiating an output of said position detector.

3. A two-stage actuator control device as claimed in claim 1 wherein said means for generating a speed signal comprises a speed detector.

4. A two-stage actuator control device as claimed in claim 1 wherein said first actuator means comprises a first actuator driving circuit connected in series with a first actuator.

5. A two-stage actuator control device as claimed in claim 4 wherein the first actuator comprises a tracking actuator for an optical disk.

6. A two-stage actuator control device as claimed in claim 1 wherein said second actuator means comprises a series connection of a low pass filter, a second actuator driving circuit and a second actuator.

7. A two-stage actuator control device as claimed in claim 6 wherein the second actuator comprises a linear motor.

8. A two-stage actuator control device comprising:
    a stabilizing compensator which generates an output signal;
    first actuator means for generating a first positioning signal, said first actuator means having an input and an output;
    means for generating a speed signal for said first actuator, said means for generating a speed signal having an input and an output, the input of said means for generating a speed signal being connected to the output of said first actuator means, the speed signal having a frequency substantially equal to the primary resonance frequency of said first actuator;
    second actuator means for generating a second positioning signal, said second actuator means having an input and an output, the output of said stabilizing compensator being connected to the input of said second actuator means said first actuator means being mounted on said second actuator means;
    logic means for subtracting the speed signal from the output signal from said stabilizing compensator, said logic means having an output connected to the input of said first actuator means;
    means for generating an error signal of an absolute position of said second actuator means; and
    means for subtracting the error signal from a target position signal to generate a control deviation signal for input to said stabilizing compensator.

* * * * *